United States Patent [19]

Harwood et al.

[11] Patent Number: 5,491,394
[45] Date of Patent: Feb. 13, 1996

[54] ACCELERATION SENSING WRITE DISABLE SYSTEM UTILIZING ACTUATOR ARM COIL

[75] Inventors: Gordon A. Harwood, Longmont; Harold J. Beecroft, Colorado Springs; Robert L. Metz, Westminster, all of Colo.

[73] Assignee: Maxtor Corporation, San Jose, Calif.

[21] Appl. No.: 109,816

[22] Filed: Aug. 20, 1993

[51] Int. Cl.[6] .................................. G05B 9/02; G11B 5/54
[52] U.S. Cl. ........................ 318/563; 318/611; 318/460; 360/69; 360/105; 360/60
[58] Field of Search .................................. 318/561, 560, 318/567, 460, 611, 563, 594, 616, 114, 138, 254, 623; 360/105, 69, 75, 60, 65; 388/816

[56] References Cited

U.S. PATENT DOCUMENTS

| | | | |
|---|---|---|---|
| 3,626,264 | 12/1971 | Halfhill | 388/816 |
| 4,200,827 | 4/1980 | Oswald | 318/561 |
| 4,589,036 | 5/1986 | Bertschy et al. | 360/75 |
| 4,679,102 | 7/1987 | Wevers et al. | 360/75 |
| 4,901,569 | 2/1990 | Lui | 73/517 R |
| 4,979,055 | 12/1990 | Squires et al. | 360/69 |
| 5,043,834 | 8/1991 | Kubo et al. | 360/105 |
| 5,223,771 | 6/1993 | Chari | 318/254 |
| 5,289,097 | 2/1994 | Erikson et al. | 318/561 |
| 5,303,101 | 4/1994 | Hatch et al. | 360/105 |
| 5,333,138 | 7/1994 | Richards et al. | 360/60 |

*Primary Examiner*—John W. Cabeca
*Attorney, Agent, or Firm*—Sheridan Ross & McIntosh

[57] ABSTRACT

A hard disk drive that contains a detection circuit which senses the back emf of a voice coil. The detection circuit generates a shock detection signal when the back emf of the voice coil exceeds a pre-determined value. The write disable gate of the disk drive is disabled when the voltage detection circuit generates the shock detection signal.

18 Claims, 2 Drawing Sheets

ACCELERATION SENSING WRITE DISABLE SYSTEM UTILIZING ACTUATOR ARM COIL

BACKGROUND OF THE INVENTION

1. Field of the Invention

The present invention relates to a shock sensing system that disables the write gate of a hard disk drive when the disk drive is subjected to an excessive shock load.

2. Description of Related Art

Hard disk drives contain one or more magnetic disk which are typically organized into a plurality of annular tracks. Data is stored within the disk drive by locating a magnetic head above a particular track and then magnetizing the disk. The magnetic head is mounted to an actuator arm which can move the head to any one of the track locations. The tracks may have segments which contain coded information that uniquely identify each track. Proper track location can be obtained by reading the coded information within the track segments and moving the magnetic head accordingly.

To reduce system errors, it is desirable to locate the magnetic head within the boundaries of each track during the read and write operations of the disk drive. If the magnetic head is moved toward an adjacent track by an external disturbance, the data in the adjacent track can be corrupted if a write operation is in progress. For example, if the magnetic head moves while the system is writing, the new data may write over the old data on the adjacent track, resulting in an unrecoverable loss of the old data.

Present hard disk drives typically prevent head movement by employing either a continuous servo system or a sample servo system. In a sample servo system, each track contains a segment(s) which has embedded signals that are interpreted by the control circuitry to determine if the head is not aligned with the track. If the head is off-center, the control circuit moves the actuator arm accordingly. As the disk spins, the servo segments periodically rotate below the heads, so that the head location can be periodically computed and adjusted.

A continuous servo system is typically employed in a multi-disk drive unit. A continuous system has a single head and an entire disk surface dedicated to sensing the location of the heads. The servo head is rigidly attached to the other magnetic heads, so that the head locations can be constantly monitored.

Hard disk drives used in portable computers are particularly susceptible to external shock and vibrational loads. An excessive shock or vibrational load may cause the magnetic head to move to an adjacent track. If this head movement occurs while the drive is writing data, the old data on the adjacent track will be lost. It is therefore desirable to have a disk drive unit which prevents data from being lost when the disk drive is subjected to an external load. Because of the periodic nature of sample servo systems, such systems are too slow to prevent at least some data from being lost, particularly if a high frequency shock were to occur while the head was between the servo segments of the track. Although continuous servo systems provide a faster response, such systems require a dedicated disk surface which reduces the storage space of the overall system.

Application Ser. No. 07/976,441 filed on Nov. 13, 1992 and assigned to the same assignee as the present invention, discloses a system which disables the write gate of the transducer when the disk drive is subjected to a shock load that exceeds a predetermined value. The system contains a mechanical transducer which senses any acceleration of the disk drive. The transducer provides an output signal which is coupled to a circuit that disables the write gate if the signal exceeds a threshold value. Although effective in sensing shock, mechanical transducers occupy valuable space within the disk drive. Additionally, the transducer is mounted to the base plate of the drive and therefore does not provide an accurate indication of the relative movement between the actuator arm and the disk. It would therefore be desirable to provide an accurate shock sensing system that would require a minimal amount of space.

SUMMARY OF THE INVENTION

The present invention is a system that disables the write gate of a hard disk drive when the disk drive is subjected to a shock load that exceeds a predetermined value. The disk drive contains an actuator arm that has a moving magnet coupled to a pair of voice coils. The voice coils are coupled to a driver circuit which provides power to the coils to move the actuator arm. One of the coils is also coupled to a voltage detection circuit by a processor controlled switch. When coupled to the detection circuit, the coil provides a back emf signal that corresponds to the velocity of the actuator arm.

When the disk drive is in a seek routine both coils are coupled to the driving circuit. When the drive is in a track routine, the processor switches one of the coils from the driving circuit to the voltage detection circuit. Any movement of the actuator arm and magnet will result in a corresponding back emf voltage across the coil. The detection circuit compares the back emf voltage with a reference voltage. If the back emf signal is at least equal to the reference voltage, the detection circuit generates a shock detection signal. The system further includes a write disable circuit which disables the write gate when the detection circuit generates the shock detection signal.

It is therefore an object of the present invention to provide a shock/write gate disable system that utilizes the voice coil of a hard disk drive.

It is also an object of the present invention to provide a shock/write gate disable system which accurately detects any relative movement between the actuator arm and the rotating disk of a hard disk drive.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
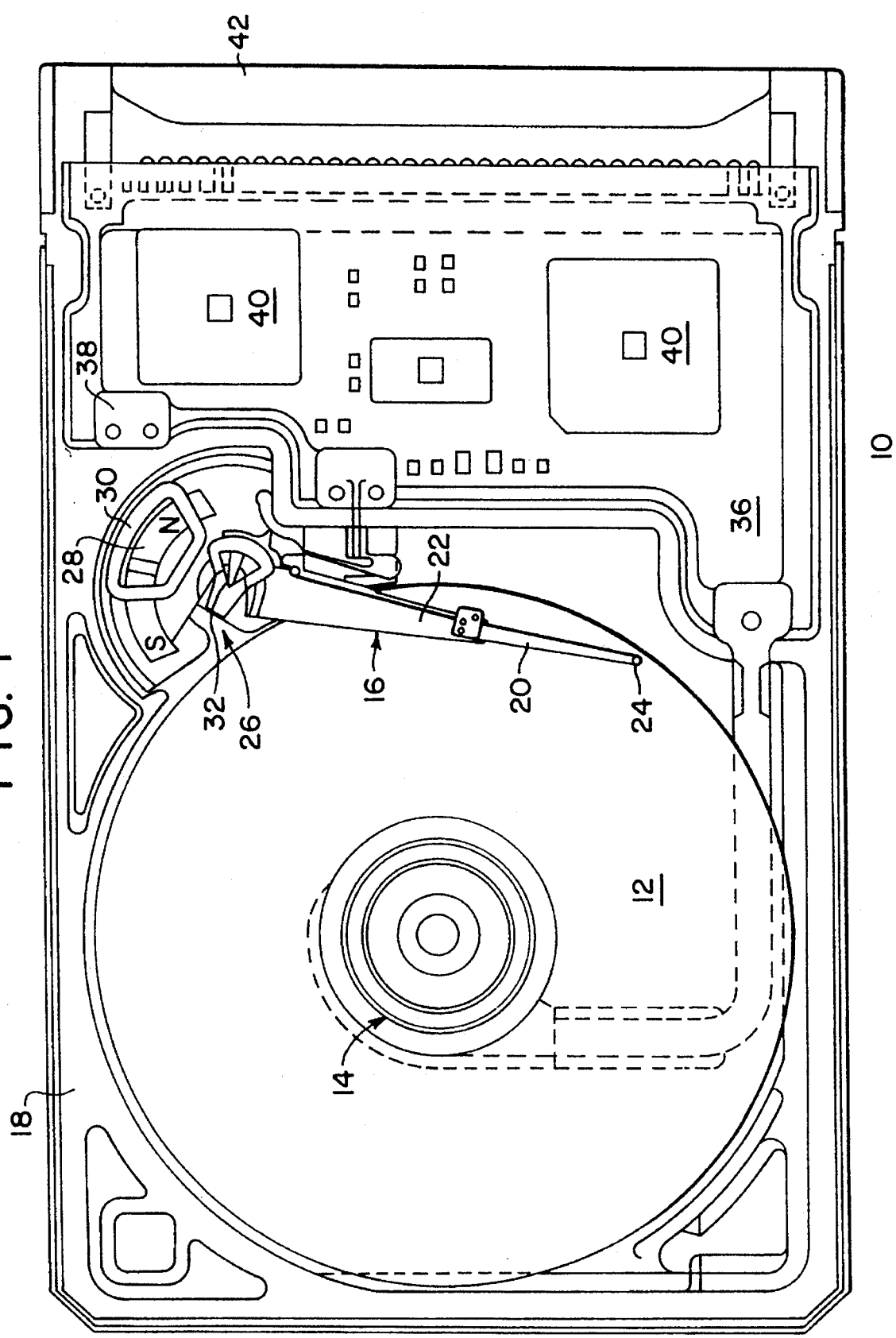
FIG. 1 is a top view of a hard disk drive.
Figure 2:
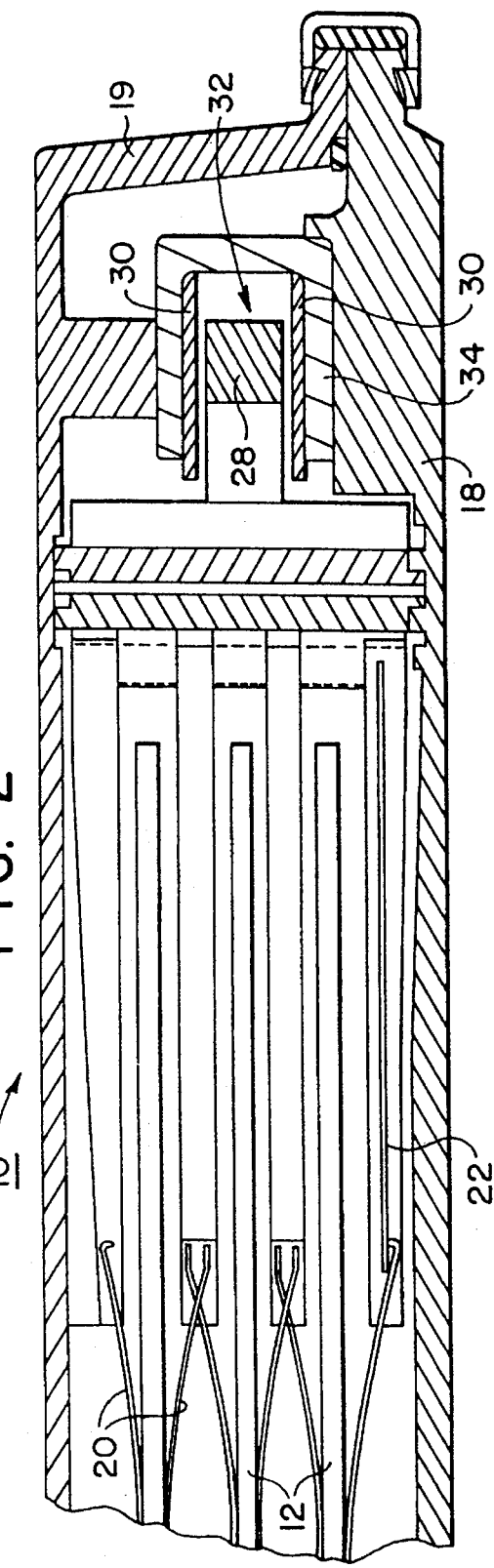
FIG. 2 is a side view of an actuator arm of the hard disk drive.

Referring to the drawings more particularly by reference numbers, FIGS. 1 and 2 show a hard disk drive assembly 10. The disk drive 10 contains a disk 12 which is rotated by a spin motor 14 relative to an actuator arm assembly 16. The spin motor 14 and actuator assembly 16 are mounted to a base plate 18. The disk drive 10 also includes a cover plate 19 that is coupled to the base plate 18, and encloses the disk 12 and actuator arm 16.

The actuator arm assembly 16 includes a flexbeam 20 attached to an actuator arm 22. A transducer 24 is mounted to the end of the flexbeam 20. The transducer is constructed to magnetize and sense the magnetic field of the disk 12. The actuator arm 16 pivots about a bearing assembly 26 that is mounted to the base plate 18.

As shown in FIG. 2, attached to the end of the actuator arm 22 is a magnet 28 located between a pair of coils 30. The magnet 28 and coils 30 are commonly referred to as a voice coil motor 32 (VCM). The coils 30 are mounted to a shield plate 34 that provides a magnetic flux return path and which maintains the flux of the coils within the area of the VCM 32. As shown in FIG. 1, the magnet 28 has north (N) and south (S) poles, such that when a current is provided to the coils 30 in one direction the actuator arm 22 rotates in a first direction, and when current is provided in a second direction, the actuator arm 22 rotates in a second opposite direction.

The coils 30 are coupled to a printed circuit board 36 by a flexible circuit board 38. The printed circuit board 36 is mounted to the base plate 18 and contains a plurality of integrated circuit packages 40. The packages 40 contain integrated circuits which operate the disk drive assembly 10. The printed circuit board 38 is connected to an electrical connector 42 which plugs into a host system (not shown).

The disk 12 is typically divided into a plurality of radially concentric tracks that each have a number of data sectors. Each sector may also have embedded servo information. The electronic system of the disk drive typically controls the actuator arm assembly 16 within either a track routine or a seek routine. In a track routine the system maintains the transducer in the center of the track. Any deviation from the centerline of the track may cause errors in the reading or writing of information from the disk. During a seek routine the transducer is being moved from one track (cylinder) location to another track (cylinder) location.

The disk drive assembly 10 may be subjected to an external shock load that moves the actuator arm 22 relative to the disk 12. If the disk drive is writing information, movement of the transducer 24 onto a different track may result in an irrecoverable loss of data.

Figure 3:
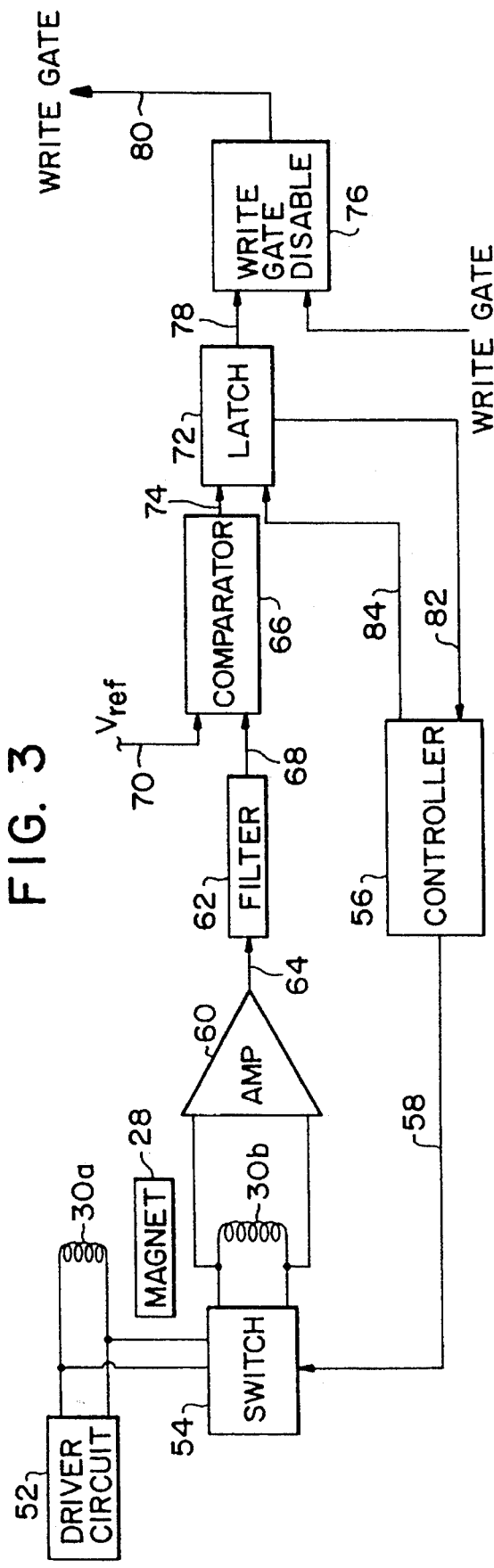
FIG. 3 is a schematic of a shock/write gate disabling system.

FIG. 3 is a schematic of a circuit 50 which prevents the writing of data onto the disk 12, when the disk drive is subjected to a shock load that exceeds a predetermined value. The circuit 50 contains a driver circuit 52 which provides a driving current to the coils 30a and 30b of the voice coil motor 32. The coil 30b is coupled to the driver circuit 52 by a switch circuit 54 that is controlled by a microprocessor based controller 56 through line 58.

When the disk drive is in a seek routine, the controller 56 provides an input signal to the switching circuit 54 which connects the coil 30b to the driver circuit 52, so that both coils 30a and 30b are coupled to the magnet 28. When the disk drive is in a track routine, the controller 56 and switch circuit 54 decouple the coil 30b from the driver circuit 52. Any movement of the actuator arm 22 and the accompanying magnet 28 will create a back emf voltage across the coil 30b. The amplitude of the back emf voltage is proportional to the velocity of the actuator arm 22. Therefore an increase in the velocity of the arm 22 will create a corresponding increase in the value of the back emf signal.

The back emf signal is amplified by an amplifier circuit 60. The amplified back emf signal is provided to a filter circuit 62 on line 64. The filter 62 has a bandwidth approximately centered about the frequency of the back emf signal. Even when the disk drive is in a tracking routine, current is periodically provided to the coil 30a. The current of coil 30a may be inducted to coil 30b. This inducted current creates a voltage across the coil 30b which can "wash out" the back emf signal. The wash out effect of the inducted current can be reduced by providing a high impedance driver circuit 52 and by providing the coil 30a with a driving voltage that has a frequency in a different range than the frequency range of the back emf signal. The filter circuit 62 is constructed to filter out the driving current that is coupled to coil 30b from coil 30a and the driver circuit 52.

The output of the filter circuit 62 is provided to a comparator circuit 66 on line 68. The comparator 66 compares the back emf signal to a reference voltage Vref on line 70. If the back emf signal is equal to or greater than the Vref signal, the comparator circuit 66 provides a shock detection signal to a latch circuit 72 on line 74. The Vref signal is set to approximate the voltage level of a back emf signal, that corresponds to a velocity of the actuator arm, which has been subjected to a shock load, and which may move the transducer a predetermined distance from the centerline of the track. The shock detection signal therefore represents the sensing of a shock load.

The shock detection signal sets the latch circuit 72, which provides an enable signal to a write gate disable circuit 76 on line 78. The pre-amplifier circuit (not shown) of the disk drive is at least partially controlled by a write gate signal on line 80. The write gate signal is typically generated by a data interface circuit (not shown) which provides an interface between the host and the read/write chip (not shown) of the drive. The write gate is routed through the write disable circuit 76, which can disable the write gate and prevent the transducer 24 from writing information onto the disk 12. Upon receiving the enable signal, the write disable circuit 76 disables the write gate and prevents any further writing of information by the transducer 24.

The latch circuit 72 also provides a feedback signal 76 to the controller 56 on line 82. The feedback signal provides an indication to the controller 56 that a threshold movement of the actuator arm 22 has been detected. The controller may then initiate a position error routine to move the transducer 24 back to the original track. The controller 56 may also have a timer circuit which resets the latch circuit 72 on line 84. The controller 56 may therefore reset the latch circuit 72 a predetermined time interval after the latch 72 is set. Alternatively, the controller 56 may only reset the latch after the transducer 24 is returned to the original track, or upon the occurrence of another event.

In operation, during a track routine the controller 56 decouples the coil 30b from the driver circuit 52. The disk drive may then be subjected to a shock load which moves the actuator arm 22. Movement of the arm 22 generates a back emf signal which is amplified, filtered and provided to comparator circuit 66. If the arm movement exceeds a predetermined velocity, the comparator circuit 66 provides a shock detection signal, which sets the latch 72 and disables the write gate. The latch 72 is then reset by the controller 6 so that the transducer 24 can again write information.

As an alternate embodiment, the system may have a dedicated coil separate from the voice coils 30a and 30b. The dedicated coil can be connected to the amplifier 60 and filter 62 circuits to provide a back emf signal to the detection circuitry. The dedicated coil may be coupled to the amplifier by the processor controlled switch 54, which decouples the coil from the detection circuitry when the disk drive is in a seek routine. As a further alternative, the coiled 30b could be connected to the detection circuitry and the driver circuit 52 without any switches (54). In this embodiment, the filter 62 would filter out the driving current provided by the driver circuit 52.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A shock sensing system that disables a write gate of a hard disk drive in response to a shock applied to the disk drive, comprising:

a rotating media;

a transducer coupled to said media;

an actuator arm that supports said transducer, said actuator arm being adapted to move relative to said media;

a magnet coupled to said actuator arm;

a first coil coupled to said magnet, said first coil being capable of providing a back emf signal in response to a movement of said actuator arm;

a driver circuit that provides a current to said first coil to move said actuator arm;

a switch circuit having first and second switch positions and being electrically communicable with said first coil, said first coil electrically connected to said switch circuit in said first position wherein said current from said driver circuit flows between said switch circuit and said first coil during a track seeking operation when said actuator arm is moving relative to said media and said first coil being electrically disconnected from said switch circuit in said second position wherein substantially no current flows between said switch circuit and said first coil during a track routine operation in which the transducer is maintained in a track on said media;

a voltage detection circuit which generates a shock detection signal when said back emf signal exceeds a predetermined voltage during said track routine operation; and a write disable circuit which disables the write gate in response to the generation of said shock detection signal.

2. The system as recited in claim 1, further comprising a second coil coupled to said magnet, said first and second coils being connected to said driver circuit that provides said current to each of said first and second coils to move said actuator arm.

3. The system as recited in claim 1, wherein said voltage detection circuit includes a filter circuit that filters out all but a narrow band of back emf signal frequencies.

4. The system as recited in claim 3, wherein said voltage detection circuit includes an amplifier circuit that amplifies said back emf signal.

5. The system as recited in claim 4, wherein said voltage detection circuit includes a comparator which compares said back emf signal with a reference voltage and generates said shock detection signal when said back emf signal is at least equal to said reference voltage.

6. A shock sensing system that disables a write gate of a hard disk drive in response to a shock applied to the disk drive, comprising:

a rotating media;

a transducer coupled to said media;

an actuator arm that supports said transducer, said actuator arm being adapted to move relative to said media;

a magnet mounted to said actuator arm;

a first coil coupled to said magnet, said first coil being capable of providing a back emf signal in response to a movement of said actuator arm;

a second coil coupled to magnet;

a driver circuit that provides a current to said first and second coils to move said actuator arm during a track seeking operation in which said actuator arm is being moved to a desired track on said media;

a voltage detection circuit which generates a shock detection signal when said back emf signal exceeds a predetermined voltage;

a write disable circuit which disables the write gate and responds to the generation of said shock detection signal; and a switching circuit that switches said first coil between said driver circuit and said voltage detection circuit, said switching circuit having first and second switch positions, said first coil being electrically connected to said switching circuit in said first switch position wherein said current from said driver circuit flows between said switching circuit and said first coil during the track seeking operation and said first coil being electrically disconnected from said switching circuit in said second switch position wherein substantially no current flows between said driver circuit and said first coil.

7. The system as recited in claim 6, wherein said voltage detection circuit includes a filter circuit that filters out all but a narrow band of back emf signal frequencies.

8. The system as recited in claim 7, wherein said voltage detection circuit includes an amplifier circuit that amplifies said back emf signal.

9. The system as recited in claim 8, wherein said voltage detection circuit includes a comparator which compares said back emf signal with a reference voltage and generates said shock detection signal when said back emf signal is at least equal to said reference voltage.

10. A shock sensing system that disables a write gate of a hard disk drive in response to a shock applied to the disk drive, comprising:

media means for storing information;

transducer means for transferring said information with said media;

actuator arm means for moving said transducer means relative to said media means;

a magnet coupled to said actuator arm;

coil means for generating a back emf signal in response to a movement of said actuator arm means, said coil means including a first coil and a second coil coupled to said magnet, said first and second coils being separated from each other and both of them receiving a current for moving said actuator arm means during a track seeking operation, said first coil and said magnet also being used to generate said back emf signal during a track routine operation when the shock is applied;

voltage detection means for generating a shock detection signal when said back emf signal exceeds a predetermined voltage; and write disable means for disabling the write gate in response to the generation of said shock detection signal.

11. The system as recited in claim 10, wherein said current is provided to said first and second coils by driver means.

12. The system as recited in claim 11, further comprising switch means for switching said first coil between said driver means and said voltage detection means.

13. The system as recited in claim 10, wherein said voltage detection means includes filter means for filtering out all but a narrow band of back emf signal frequencies.

14. The system as recited in claim 13, wherein said voltage detection means includes amplifier means for amplifying said back emf signal.

15. The system as recited in claim 14, wherein said voltage detection means includes comparator means for comparing said back emf signal with a reference voltage and generating said shock detection signal when said back emf signal is at least equal to said reference voltage.

16. A method for disabling a write gate in a hard disk drive that is subjected to a shock load, comprising the steps:

conducting a seek operation by moving an actuator arm and a transducer using a magnet and a first coil coupled to said magnet;

performing a track routine operation during which said actuator arm is in substantially the same position relative to a track on a disk of the disk drive;

generating a back emf signal using said magnet and said first coil during said performing step in response to a movement of the transducer;

filtering out all but a predetermined bandwidth of back emf signal frequencies;

comparing said back emf signal to a reference signal; and disabling the write gate if said back emf signal exceeds said reference signal.

17. The method as recited in claim 16, wherein said conducting step includes switching a switch circuit to enable said first coil to receive a current from a driver circuit.

18. The method as recited in claim 16, wherein said performing step includes switching a switch circuit to substantially prevent said first coil from receiving a current from a driver circuit.

* * * * *